United States Patent [19]

Kuchar

[11] Patent Number: 6,074,297
[45] Date of Patent: Jun. 13, 2000

[54] ROTATING CYLINDER WITH FLAT FILLER PLATES FOR USE WITH TAPERED CONCAVE IN COMBINE

[76] Inventor: George J. Kuchar, P.O. Box 595, Carlinville, Ill. 62626

[21] Appl. No.: 09/120,525

[22] Filed: Jul. 22, 1998

[51] Int. Cl.[7] ................................................. A01F 11/06
[52] U.S. Cl. ........................................... 460/46; 460/72
[58] Field of Search ............................. 460/32, 46, 71, 460/108, 110, 23, 85, 72

[56] References Cited

U.S. PATENT DOCUMENTS

| | | | |
|---|---|---|---|
| 1,821,316 | 9/1931 | Oakes | 460/46 |
| 3,203,428 | 8/1965 | Ausherman | 130/27 |
| 3,256,887 | 6/1966 | Ausherman | 130/27 |
| 3,259,134 | 7/1966 | Stokland | 460/71 |
| 3,631,861 | 1/1972 | Skahill | 460/46 |
| 3,856,022 | 12/1974 | Buchele et al. | 130/6 |
| 3,927,679 | 12/1975 | Ausherman | 130/27 |
| 4,018,232 | 4/1977 | Rowland-Hill et al. | 130/27 T |
| 4,078,571 | 3/1978 | Todd et al. | 130/27 T |
| 4,249,543 | 2/1981 | Rowland-Hill | 130/27 T |
| 4,310,005 | 1/1982 | De Busscher et al. | 130/27 P |
| 4,796,645 | 1/1989 | Kuchar | 130/27 |
| 4,909,772 | 3/1990 | Kuchar | 460/71 |
| 5,192,246 | 3/1993 | Francis et al. | 460/72 |
| 5,487,703 | 1/1996 | Kuchar | 460/85 |
| 5,489,239 | 2/1996 | Matousek et al. | 460/62 |
| 5,569,080 | 10/1996 | Estes | 460/72 |

FOREIGN PATENT DOCUMENTS

| | | | |
|---|---|---|---|
| 3631261 | 3/1988 | Germany | 460/46 |
| 256423 | 1/1978 | U.S.S.R. | 460/72 |
| 923440 | 4/1982 | U.S.S.R. | 460/72 |
| 1158089 | 5/1985 | U.S.S.R. | 460/72 |
| 1754000 | 8/1992 | U.S.S.R. | 460/32 |
| 2128865 | 5/1984 | United Kingdom | 460/72 |

*Primary Examiner*—Thomas B. Will
*Assistant Examiner*—Arpad Fabian Kovacs
*Attorney, Agent, or Firm*—Emrich & Dithmar

[57] ABSTRACT

A rotating cylinder is used with a complementary fixed concave in a combine to separate grain from the leafy portion of the plant. The elongated cylinder is comprised of a plurality of aligned star-shaped hubs disposed in a spaced manner along its length. An elongated, linear raspbar is attached to each "point" of the aligned star-shaped hubs and extends the length of the cylinder for engaging and urging the plant against the concave and separating the grain from the plant's leafy portion. A flat elongated filler plate is disposed between each pair of adjacent raspbars for preventing the grain and crop residue from entering the hollow cylinder and for displacing the grain and crop residue rearwardly along the concave where it is discharged onto another combine grain processing and separation stage. The flat profile of the filler's plate prevents the grain and crop residue from remaining on the surface of the rotating cylinder for improved grain threshing. The fixed concave includes a plurality of spaced cross bars extending the length thereof and has a tapered profile in proceeding from front to rear. In addition, the spacing between adjacent cross bars of the concave decreases in proceeding from the front, or intake, end of the concave towards its rear, or discharge, end. The increased thickness of and greater separation between adjacent cross bars at the concave's intake end provide improved grain/crop residue separation, while the reduced concave thickness and reduced cross bar separation at its discharge end facilitates crop residue discharge.

11 Claims, 5 Drawing Sheets

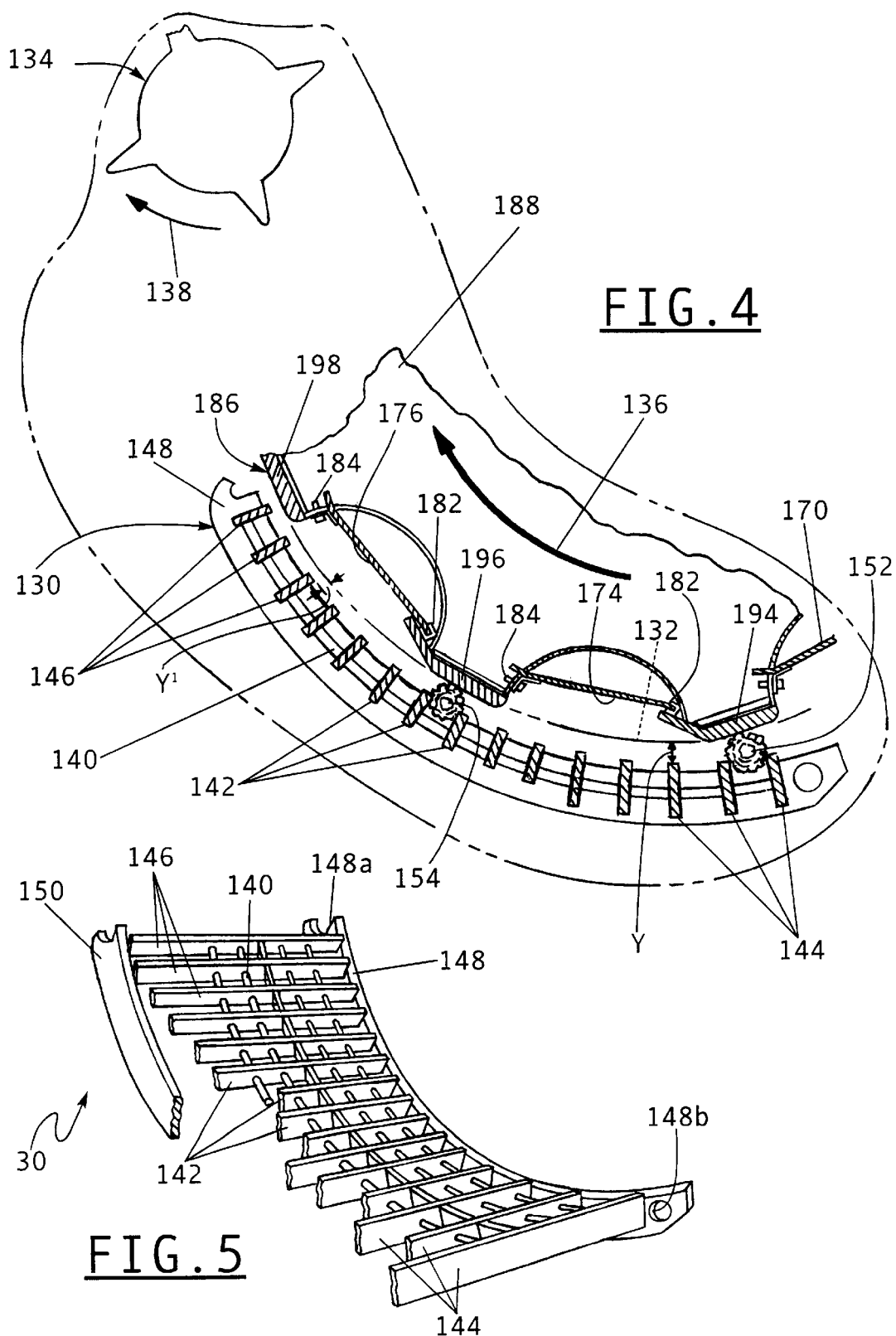

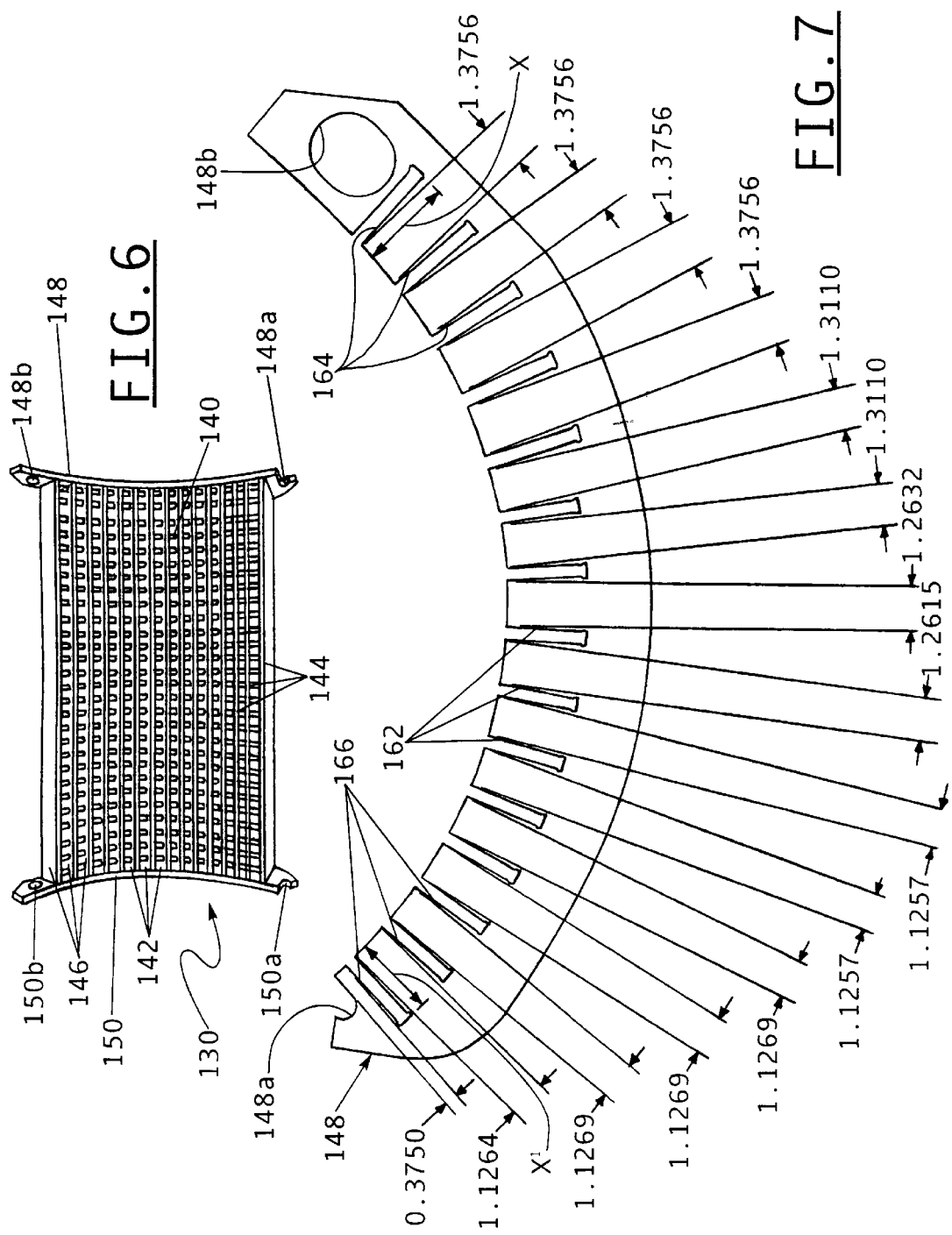

ROTATING CYLINDER WITH FLAT FILLER PLATES FOR USE WITH TAPERED CONCAVE IN COMBINE

FIELD OF THE INVENTION

This invention relates generally to combines as used in the harvesting of crops and is particularly directed to the rotating cylinder/fixed concave crop threshing stage in an agricultural combine.

BACKGROUND OF THE INVENTION

A combine is an agricultural vehicle used in the harvesting of crops. A forward header assembly typically is substantially wider than the aft portion of the combine and includes a plurality of spaced corn or row crop heads which are adapted for engaging the crops in removing the grain therefrom. The thus removed grain, in combination with crop residue such as husks in the case of corn harvesting, are then automatically delivered to the aft drive and processing portion of the combine which includes a complicated threshing system for further separating the grain from the crop residue and for off-loading the thus separated grain from the combine into a transport vehicle such as a truck. The crop residue is then exhausted from an aft portion of the combine and deposited in the field being harvested.

Combines typically make use of a rotating cylinder in the early stages of grain-crop residue separation. The cylinder is typically oriented horizontally and transversely to the direction of combine travel and is adapted to receive that portion of the crop which is separated from the plant by the forward header assembly. The rotating cylinder operates in cooperation with a fixed concave structure positioned adjacent to and below the cylinder. The cylinder-concave combination operates to separate the grain from the husk or leafy portion of the plant. The cylinder generally includes a first plurality of spaced raspbars around its periphery and extending the length thereof, while the concave includes a second plurality of stationary, spaced bars generally parallel to the raspbars. The crop is directed to the space between the rotating cylinder and the concave and the action of the rotating cylinder upon the crop as it is engaged by both the rotating cylinder and concave causes the grain bearing portion of the plant, i.e., the cob in corn harvesting, to become separated from the remaining portion of the plant, i.e., the leafy portion. The grain is then subjected to additional processing for further separation, while the crop residue is discharged from the combine.

The grate-like concave includes a large number of slots, or apertures, therein formed by the aforementioned second plurality of stationary, spaced bars and a plurality of concave cross bars extending between forward and aft portions of the concave. Unfortunately, the combine ingests more than just plant material. Rocks, soil and other debris taken in by the combine tend to inhibit the various threshing operations within the combine, reducing the efficiency of the grain separation process and the amount of grain recovered.

Referring to FIG. 1, there is shown a partially cutaway perspective view of a typical combine 40 which incorporates a prior art cylinder and concave arrangement. The combine 40 is comprised primarily of an aft separator/drive section 42 and a forward header assembly 50 attached to a forward portion of the separator/drive section. The separator/drive section 42 includes a cab 44 in which an operator sits and in which are positioned various operating controls for the combine. The separator/drive section 42 effects separation of the grain from the crop residue and includes a plurality of wheels 46 as well as a means for propulsion (typically a diesel engine which is not shown for simplicity) for moving the combine 40 through a field in harvesting the crops. The separator/drive section 42 includes an aft or exhaust end 42a from which the crop residue, after the grain is separated therefrom, is discharged from the combine 40 and deposited in the field being harvested.

The header assembly 50 mounted to a forward portion of the separator/drive section 42 is wider than the separator/drive section and includes a plurality of head units extending along the length thereof, such as the corn heads 52 illustrated in FIG. 1. The header assembly 50 may also be provided with a plurality of spaced row crop heads along the length thereof for harvesting soybeans, wheat, milo or rice. The corn heads 52 are adapted to separate and remove the ears of corn from the plant stalk. The grain and the plant residue are then delivered to an aft portion of the header assembly 50 and are directed to the center thereof by means of a left- and right-hand spiraled auger 54. From the center, aft portion of the header assembly 50, the grain and residue mixture is delivered to a feeder house 56 which transports the mixture via a conveyor to the combination of a rotating cylinder drum 60 and a concave screen 62. The cylinder drum 60 includes a plurality of spaced raspbars extending along the length and spaced around the periphery thereof. Rotation of the cylinder drum 60 causes the raspbars to engage the corn husks and separate the cob from the leafy portion of the plant. A beater assembly, which is not shown in the figure, is typically positioned immediately aft of the cylinder drum 60 and concave screen 62 combination for further carrying out the separation process. The beater assembly deposits the reduced mixture upon an elongated walker assembly 64 which is comprised of a plurality of vibrating sieves. The separated grain is allowed to fall through the vibrating sieves of the walker assembly 64, while the unwanted plant residue is retained on an upper portion of the walker assembly and displaced toward the rear of the combine. The thus separated grain which falls through the vibrating sieves of the walker assembly 64 is deposited upon a cleaning shoe 68 positioned below the walker assembly and comprised of a grate structure for further separating the grain from any crop residue remaining in the mixture. As the grain and residue mixture falls upon the cleaning shoe 68, a blower 66 directs an air stream on the falling mixture to remove chaff therefrom. The chaff and other crop residue removed from the mixture in the earlier separation steps are discharged from the aft or exhaust end 42a of the combine 40. The thus cleaned grain collects in a lower portion of the separator section 58 of the combine and is laterally displaced by means of a rotating clean grain auger 70 to a center portion of the combine.

The clean grain auger 70 is coupled to and continuous with a generally vertically oriented grain elevator 80. The grain elevator 80 includes a housing 82 within which is positioned a plurality of paddles 84 attached to a moving endless chain 86. The grain elevator 80 lifts individual portions of grain upward where the grain 90 is then displaced by a loading auger 88 into a storage bin or tank 92. One end of an off-loading grain drill 94 may be positioned within the storage tank 92 for removing the grain positioned therein from the combine 40.

Referring to FIG. 2, there is shown a perspective view illustrating greater details of a prior art arrangement of a feeder house 56, a concave 62, a rotating cylinder 100, a rotating beater 104, and an upper auger 106. The cylinder 100 is positioned in closely spaced relation to the concave 62 which is disposed immediately below the cylinder and comprised of a pair of curved end brackets 101 (only one of which is shown in FIG. 2 for simplicity) and a plurality of spaced bars 102 extending along the length thereof. The concave 62 further includes a plurality of spaced, curved members disposed along its length which are also not shown in the view of FIG. 2. As previously described, the combination of the rotating cylinder 100 and the concave 62 effects separation of the grain from the leafy, or husk, portion of the plant. Disposed immediately forward of the cylinder 100 is a conveyor-type feeder assembly 56 which delivers the crop directly between the cylinder and the open-mouth concave 62 as the cylinder rotates in the direction of the arrow in FIG. 2. Disposed immediately aft of the cylinder 100 is a rotating beater assembly 104 which displaces the crop material and unseparated grain from the cylinder/concave combination for further separation processing. An upper auger (not shown) disposed above and slightly forward of the cylinder 100 returns unthreshed grain which reaches the back of the cleaning area to the cylinder area for another pass between the cylinder and the concave 62.

The cylinder 100 includes a plurality of hubs, or spiders, 112 disposed in a spaced manner along the length thereof and coupled by means of an axle, or support shaft, 110 inserted through a center of each of the hubs. Each of the hubs 112 includes a plurality of spaced, upraised peripheral portions upon which are mounted raspbars 108 which extend substantially the entire length of the cylinder 100. Each of the raspbars 108 is securely mounted to an upraised peripheral portion of each of the hubs 112 in a spaced manner by conventional means such as mounting bolts or the combination of a mounting bracket and a bolt, which are not shown for simplicity.

Positioned immediately adjacent to and attached to each of the raspbars 108 along the length thereof is a respective spacer or filler plate 114. Each of the filler plates 114 extends over a portion of the gap or space between adjacent raspbars 108 and is disposed over substantially the entire length of the cylinder 100 and has a curved cross section. The filler plates 114 may be securely coupled to each of the hubs 112 by conventional means such as bolts 118.

Referring to FIG. 3, there is shown a sectional view of a portion of the prior art concave 62, rotating cylinder 100, and rotating beater 104 arrangement. As previously described, the rotating cylinder 100 includes a plurality of spaced raspbars disposed about its periphery, although only four raspbars 108a through 108d are shown in the figure for simplicity. The rotating beater 104 similarly includes a plurality of spaced wings, or extensions, 104a and 104b disposed about its periphery and extending the length thereof. The cylinder 100 as well as the beater 104 each rotate in a clockwise direction as shown by the direction of the arrows in the figure. The harvested portion of the plant including the grain and leafy portion is directed onto the lower, leading edge of the concave 62 by the combination of the rotating cylinder 100 and the previously described feeder house which is not shown in the figure. When engaged by the concave 62 as well as the raspbars disposed about the rotating cylinder 100, the grain bearing portion of the plant, such as the corncob 119 shown in the figure, is urged between the grate-like structure of the concave in a downward direction. The leafy residue of the plant is displaced rearward and upward along the upper surface of the concave 62 by the rotating raspbars of the cylinder 100. As the leafy residue arrives at the upper edge of the concave 62, it is positioned in the vicinity of the rotating beater 104 which then displaces the leafy residue rearwardly over a short flat finger grate 109. The finger grate 109 is positioned adjacent to the upper, aft edge of the concave 62 for supporting the leafy residue and maintaining it in position for rearward displacement by the rotating beater 104. After exiting the concave, cylinder, and beater assembly, the leafy residue is then further processed for the removal of additional grain therefrom and discharge from the combine.

The concave 62 includes a pair of curved brackets 101 on each end thereof. Each of the curved end brackets 101 is securely attached to a respective inner wall of the combine by means of an upper mounting bolt 103 and a lower mounting bolt 105. Extending between and mounted to each of the curved end brackets 101 are a plurality of linear, spaced crossbars 102. Each of the crossbars 102 is further coupled to a plurality of spaced, curved intermediate bars 107 along the respective lengths thereof. The combination of the crossbars 102 and curved intermediate bars 107 forms a grate like structure having a plurality of generally rectangular-shaped apertures therein.

As shown in FIG. 3, a flat finger grate 109 is disposed adjacent to the upper end of the concave 62. The flat finger grate 109 includes a plurality of spaced, elongated bars 111 extending rearward from the concave 62. The bars 111 are disposed in a spaced manner along the length of the concave 62, with their proximal ends mounted to a filler plate 117 by conventional means such as weldments. A crossbar extends between each adjacent pair of bars 111 to form the finger grate 109. Each end of the filler plate 117, which also extends along the length of the concave 62, is securely coupled to a respective mounting bracket 113. Each of the mounting brackets 113 is attached to an adjacent inner wall of the combine by means of a respective mounting pin 115. As the leafy crop residue is displaced upward by the cylinder's rotating raspbars, the finger grate 109 is intended to provide support for the crop residue as it is displaced rearward by the wings 104a, 104b of the rotating beater 104.

The spacing between the rotating cylinder and the fixed concave is critical for efficient separation of the grain and leafy portions of the plant. The prior art concave shown in FIG. 3 includes linear sections disposed adjacent to its forward and trailing edges, with a circular arcuate section disposed intermediate the leading and trailing linear sections. Adjacent to the concave's linear leading and trailing edges, the displacement between the cylinder's raspbars and the concave is greater and varies with the angular position of the raspbar. Those areas adjacent to the leading and trailing edges of the concave thus do not provide the closely spaced relation between concave and cylinder necessary for efficient threshing of the plant material ingested by the combine. In particular, with the spacing between the raspbars and the concave substantially constant in an intermediate portion of the concave and increasing near the concave's discharge end, grain not separated from the leafy portion of the plant at the intake end of the concave is not likely to be separated out so it proceeds toward the discharge end of the concave. In addition, the curved filler plates of the prior art rotating cylinder shown in FIG. 2 tend to retain the separated grain, preventing its discharge through the apertures in the concave and its separation from the leafy portion of the plant. When retained by the cylinder's curved filler plates, the grain is typically discharged rearwardly in the combine above the concave by means of the rotating beater. When discharged aft of the rotating cylinder and displaced rearwardly by the rotating beater with the leafy portion of the plant, the unseparated grain tends to be discharged from the combine into the field together with the leafy portion of the plant and is thus not recovered during harvesting. Finally, the intake end of the concave is the portion of the concave most vulnerable to damage caused by ingested non-plant debris such as rocks.

The present invention addresses and overcomes the aforementioned limitations of the prior art by providing a concave which is thicker at its leading intake end than at its aft discharge end and which is more closely spaced to its complementary rotating cylinder in proceeding toward the concave's aft discharge end for improved separation of the grain from the leafy portion of the plant. In addition, the rotating cylinder is provided with a flat, smooth outer surface between its spaced, peripheral raspbars for preventing retention of grain by the cylinder to ensure that the separated grain falls through the apertures in the concave and is recovered during harvesting.

OBJECTS AND SUMMARY OF THE INVENTION

Accordingly, it is an object of the present invention to provide an improved rotating cylinder and complementary fixed concave for use in a combine in separating grain from plant residue.

It is another object of the present invention to increase the amount of grain and plant residue processed by a combine, or the combine's throughput, by reducing the amount of unrecovered grain which is discharged into the field.

Yet another object of the present invention is to improve the crop threshing action in a combine by changing the shape and configuration of the combine's fixed concave in proceeding from the intake end of the concave to its discharge end.

This invention contemplates an arrangement in a combine for separating grain from the leafy portion of a plant comprising: a rotating cylinder having a plurality of raspbars disposed in a spaced manner about its periphery and displaced in a circular path; a rotating beater disposed aft of and above the cylinder; and a grate-like concave having a lower leading intake edge and an upper trailing discharge edge respectively disposed directly below the cylinder and the beater and subtending a generally circular arc between the edges, wherein the concave is disposed in closely spaced, parallel relation to the rotating cylinder, the concave including a plurality of cross bars disposed in a spaced manner between the leading intake and trailing discharge edges and extending the length of the concave, wherein the cross bars are arranged so as to form an increasingly smaller gap between the cylinder and the concave in proceeding from the leading intake edge to the trailing discharge edge of the concave to facilitate separation of grain from the leafy portion of a plant.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 4 is a partial sectional view of a concave, a cylinder, and a beater arrangement in accordance with the principles of the present invention;

FIG. 5 is a partial perspective view of a concave in accordance with the principles of the present invention;

FIG. 6 is a front plan view of the concave shown in FIG. 5;

FIG. 7 is a side elevation view of a curved end bracket of the concave of the present invention;

DETAILED DESCRIPTION OF THE PREFERRED EMBODIMENTS

Figure 1:
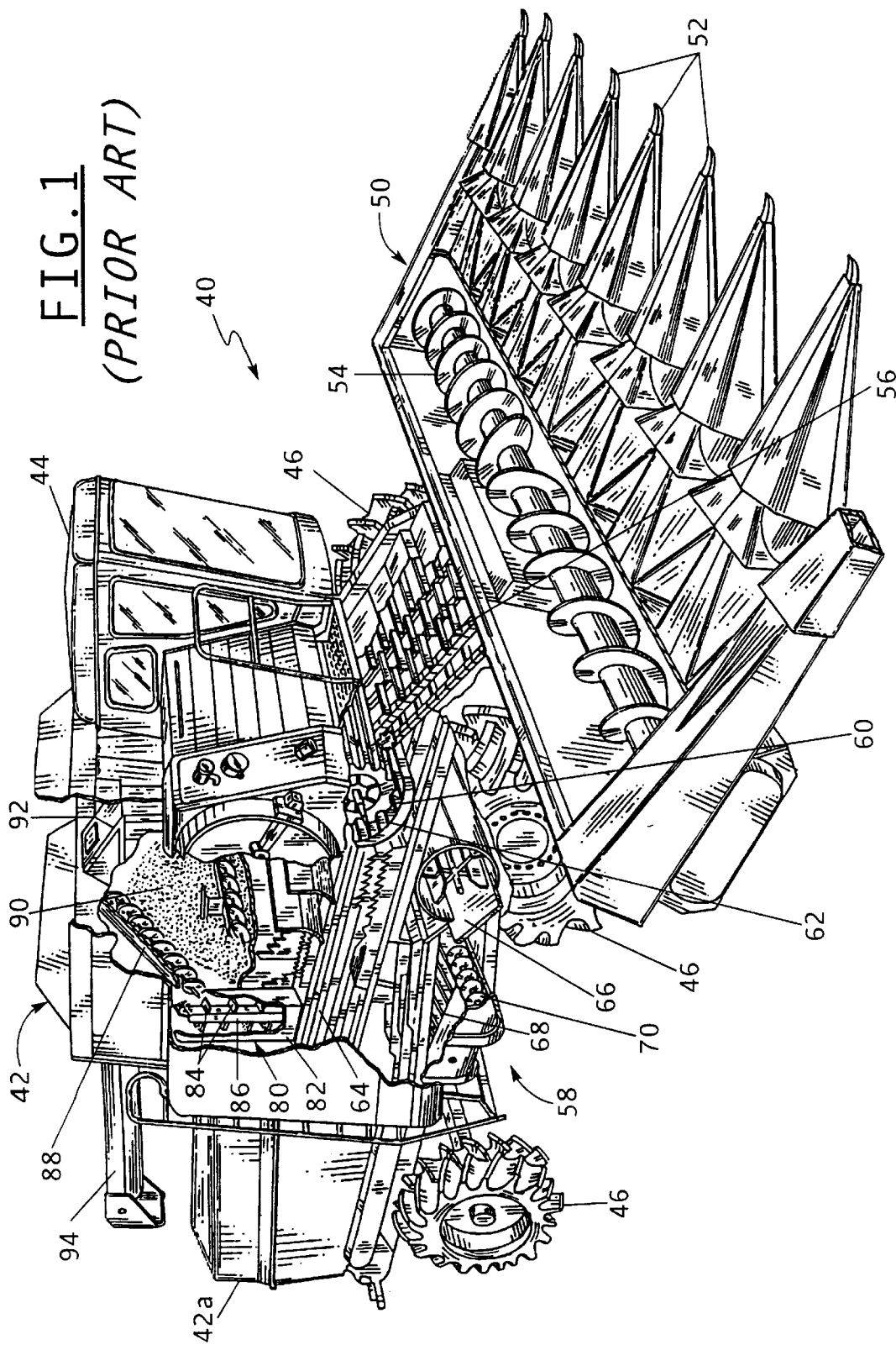
FIG. 1 is a partially cutaway perspective view of a combine illustrating the manner in which the present invention is intended for use in a conventional combine.
Figure 2:
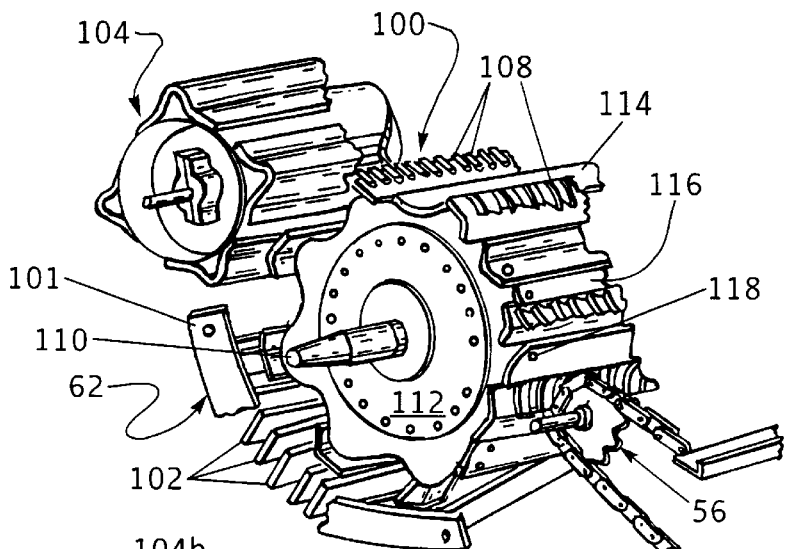
FIG. 2 is partial perspective view showing the general arrangement of a concave, a cylinder, a beater, and a conveyor arrangement such as employed in a conventional combine.
Figure 3:
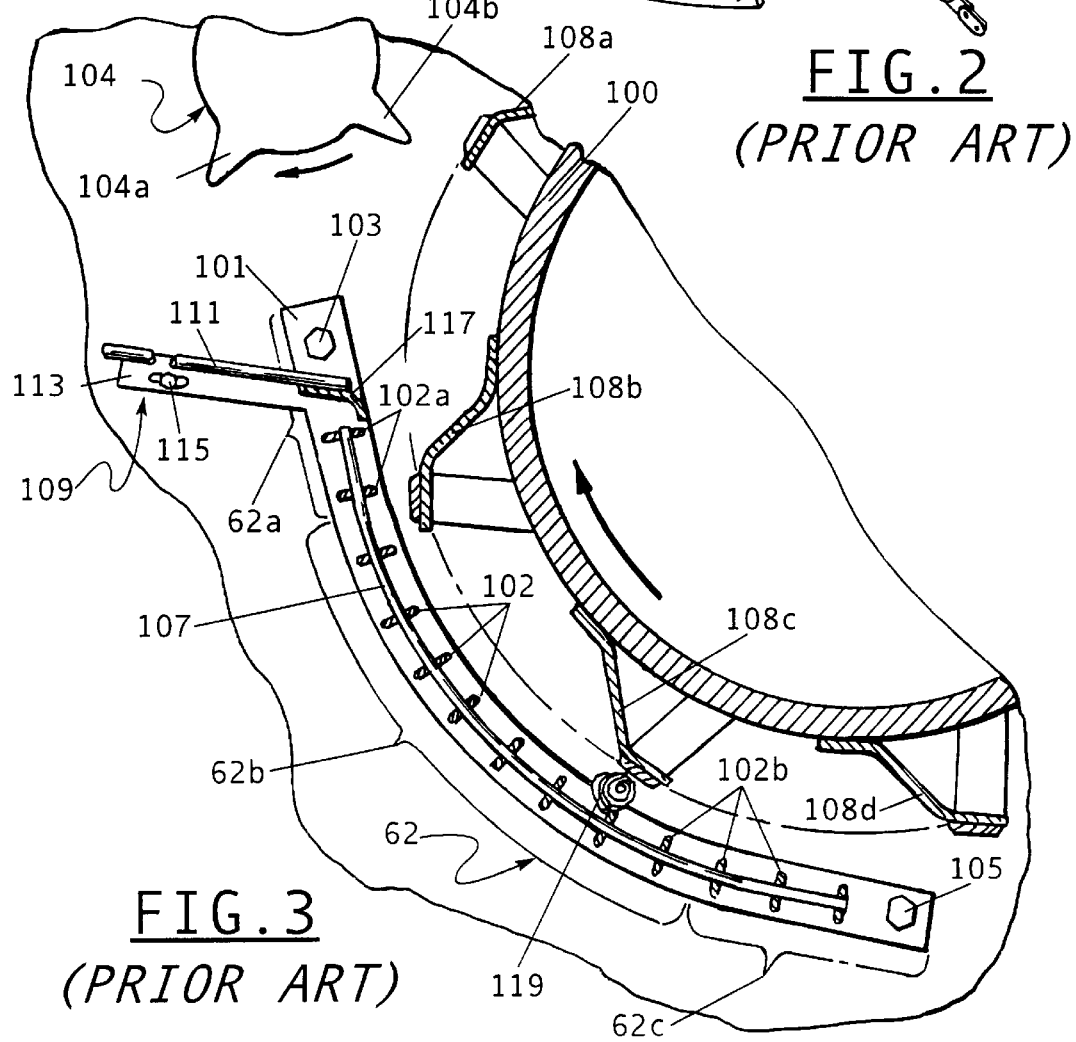
FIG. 3 is a partial sectional view of a prior art arrangement of a concave, a cylinder, and a beater used for separating the grain-bearing portion of a plant from its leafy residue in a typical prior art combine.

Referring to FIG. 4, there is shown a partial sectional view of a concave 130 and a rotating cylinder 186 combination in accordance with one aspect of the present invention. A partial perspective view and a front plan view of the inventive concave 130 are respectively shown in FIGS. 5 and 6, while FIG. 7 is a side elevation view of a curved end bracket 148 of the concave of the present invention. Concave 130 includes first and second curved end brackets 148 and 150. Disposed between and coupled to the first and second curved end brackets 148,150 by conventional means such as weldments are a plurality of cross bars. In the figures, concave 130 is shown as including a plurality of lower cross bars (some of which are identified as elements 144), a plurality of intermediate cross bars (some of which are identified as elements 142), and a plurality of upper cross bars (some of which are identified as elements 146). Lower cross bars 144 are disposed on the leading input edge of the concave 130, while the upper cross bars are disposed adjacent the trailing discharge edge of the concave. The first curved end bracket 148 includes an aft mounting slot 148a and a forward mounting aperture 148b for attaching the first end of the concave 130 to a support structure in the combine by conventional means such as nut and bolt combinations. Similarly, the second curved end bracket 150 of concave 130 includes an aft mounting slot 150a and a forward mounting aperture 150b for securely mounting the second end of the concave to a support structure within the combine.

In accordance with one aspect of the present invention, the gap or space between the lower, or leading, cross bars 144 and the rotating cylinder 186 is greater than the gap between the upper cross bars 146 and the rotating cylinder. This is shown in FIG. 4 where the distance, or gap, between the upper edge of the lower cross bars 144 and the path of travel of the raspbars 194,196 and 198 attached to the rotating cylinder 186 is given by the arrow designated as Y. The path of travel of the raspbars is identified by dotted line 132 in FIG. 4. Similarly, the distance, or gap, between the upper edge of the upper cross bars 146 and the path of travel of the aforementioned raspbars is given by the arrow designated as Y', where Y>Y'. Increased spacing between the concave 130 and the cylinder's raspbars adjacent the leading input edge of the concave allows the concave and cylinder combination to receive an increased amount of plant material, while reducing the likelihood of damage to these components caused by an ingested rock. The decreased spacing between the moving raspbars and concave 130 in proceeding toward the concave's trailing discharge edge allows the moving raspbars to more effectively direct the leafy portion of the plant, which has just been separated from the grain, toward the rotating beater assembly 134 for discharge from the concave-cylinder threshing stage. Thus, the closer spacing between the raspbars and concave 130 in proceeding toward the trailing discharge edge of the concave permits the rotating cylinder 186 to more effectively separate the grain from the leafy portion of the plant, while increased spacing between these components in proceeding toward the concave's leading input edge allows the rotating concave to more effectively clear the concave of debris such as rocks while permitting the grain to fall through the apertures in the concave for recovery.

With reference to the side elevation view of a curved end bracket 148 of the concave of FIG. 7, an additional inventive feature of the concave will now be described. Each of the concave's curved end brackets has a plurality of spaced slots along the length thereof as shown for the first curved end bracket 148 in FIG. 7. Thus, three of the lower slots in end bracket 148 are identified as elements 164; three of the intermediate slots in the end bracket are identified as elements 162; and three of the upper slots are identified in the figure as elements 166. Lower slots 164 are disposed adjacent the leading intake edge of the concave, while upper slots 166 are disposed adjacent the concave's trailing discharge edge. From the figure, it can be seen that the lower slots 164 are greater in depth than the slots closer to the concave's trailing discharge edge. Thus, the depth X of lower slots 164 is greater than the depth X' of the upper slots 166. The greater depth of the lower slots 164 allows these slots to accommodate wider cross bars within the concave. Cross bars of increased width adjacent the leading intake edge of the concave increases the strength of the concave where most needed, i.e., where the entire ingested plant as well as rocks and soil debris are first directed onto the concave. In addition, in proceeding from the lower slots 164 to the upper slots 166, it can be seen in FIG. 7 that the spacing between the slots increases. For example, the spacing between the first two lower slots 164 is 1.3756", while the spacing between the last two upper slots 166 is 1.1264". With the spacing of the concave's cross bars decreasing in proceeding toward the concave's upper trailing discharge edge, the larger gaps or spacing between adjacent lower slots 164 permit larger bodies of debris such as rocks to pass through the concave by the action of the rotating cylinder when the debris first enters the cylinder-concave threshing stage. Early removal of this non-plant debris from the cylinder-concave threshing stage facilitates separation of the grain from the leafy portion of the plant and reduces the possibility that ingested debris will find its way to later threshing stages in the combine, further complicating the grain-leafy plant portion separation and possibly even causing damage to combine threshing components. With the threshing components action of the cylinder and concave combination becoming increasingly aggressive with reduced spacing between the cylinder and concave, the reduced spacing between the concave's cross bars in proceeding toward the trailing discharge edge of the concave prevents the separated leafy residue from falling through the apertures in the concave with the separated grain.

Figure 8:
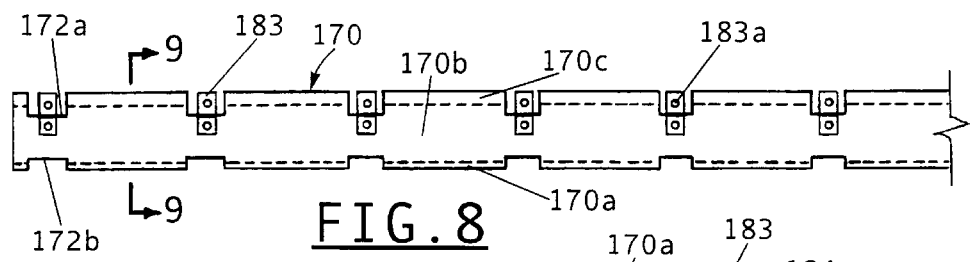
FIG. 8 is a plan view of a filler plate for use in the rotating cylinder of a combine in accordance with another aspect of the present invention.
Figure 9:
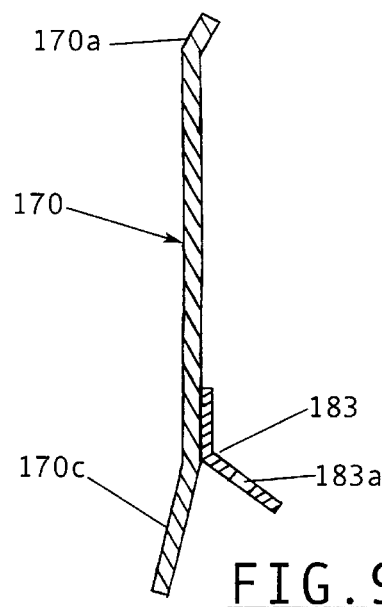
FIG. 9 is a sectional view of the filler plate shown in FIG. 8 taken along site line 9—9 therein.
Figure 10:
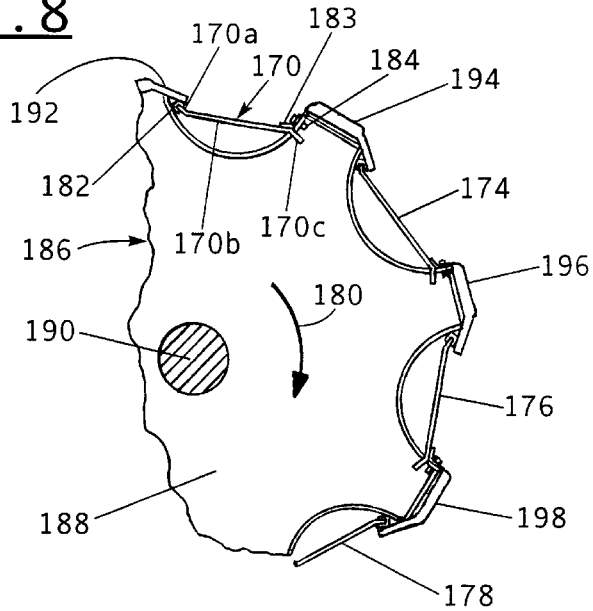
FIG. 10 is a partial end-on view of a rotating cylinder incorporating flat filler plates in accordance with one aspect of the present invention.
Figures 11, 12:
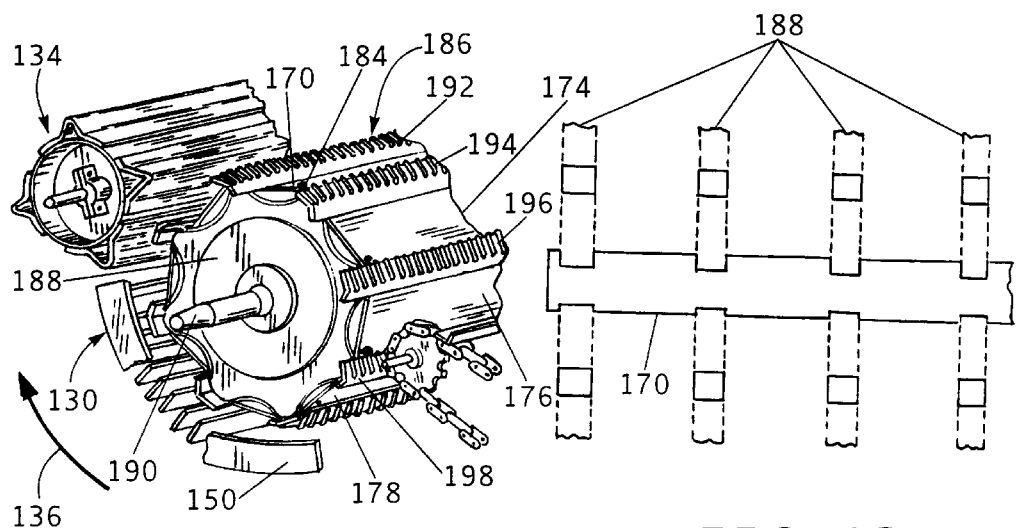
FIG. 11 is a perspective view showing the general arrangement of a concave, a cylinder, a beater and a conveyor arrangement in accordance with the principles of the present invention.
FIG. 12 is a partial plan view shown partially in phantom of a flat filler plate in accordance with the present invention coupled to a plurality of spaced star-shaped hubs of a combine's rotating cylinder.

With reference again to FIG. 4 as well as to FIG. 10, which is a partial end-on view of the rotating cylinder 186, another aspect of the present invention will now be described. FIG. 11 is a perspective view showing the general arrangement of concave 130, cylinder 186, beater assembly 134 and a portion of a conveyor arrangement illustrating additional details of this latter aspect of the invention. In accordance with this aspect of the invention, rotating cylinder 186 is provided with a plurality of flat filler plates disposed in an alternating manner with the raspbars about the cylinder, where some of the flat filler plates are shown as elements 170, 174 and 176 and some of the alternating raspbars are shown as elements 192, 194, 196 and 198 in FIGS. 10 and 11. A plan view of a flat filler plate 170 in accordance with this aspect of the present invention is shown in FIG. 8, while a sectional view of the filler plate shown in FIG. 8 taken along site line 9—9 therein is shown in FIG. 9. In FIG. 8, bend lines disposed adjacent opposed edges of the flat filler plate 170 are shown in dotted line form. Filler plate 170 includes a first angled edge 170a, a flat intermediate portion 170b, and a second angled edge 170c. Attached to filler plate 170 in a spaced manner along the length thereof by conventional means such as weldments are a plurality of mounting clips 183, each with an aperture 183a. Aperture 183a is adapted to receive a bolt 184 for securely attaching one end of the flat filler plate 170 to a star-shaped hub 188 of the rotating cylinder 186. The first angled edge 170a of flat filler plate 170 is adapted for coupling to an adjacent raspbar 192 by means of a mounting clip 182. Each of the other flat filler plates 174, 176 and 178 is also adapted for secure attachment to a star-shaped hub and a raspbar of the rotating cylinder by means of a similar arrangement of a nut and a mounting clip. Thus, as shown in FIG. 12, the flat filler plate 170 is securely connected to a plurality of aligned, star-shaped hubs 188 extending the length of the rotating cylinder in a spaced manner.

Each of the flat filler plates disposed about the rotating cylinder prevents grain from adhering to or becoming lodged on the rotating cylinder which prevents the grain from being separated from the leafy portion of the plant by not falling through the apertures of the concave. Grain which remains on the rotating cylinder is displaced rearwardly along the cylinder/concave combination and is discharged from the cylinder/concave threshing stage together with the leafy portion of the plant. Grain so displaced with the leafy portion of the plant is less likely to be separated and recovered from the leafy portion of the plant and is typically discharged from the aft of the combine together with the leafy portion of the plant. Discharge of the grain from the aft of the combine is, of course, inefficient, wasteful and expensive.

There has thus been shown an improved rotating cylinder and fixed concave combination for use in a combine in separating grain from the leafy portion of the plant. The inventive concave is provided with an arrangement of cross bars forming an increasingly smaller gap between the fixed concave and rotating cylinder in proceeding from the concave's lower leading intake edge to its upper trailing discharge edge. The increased spacing between the concave and cylinder at the lower leading intake edge of the concave facilitates removal of ingested debris such as rocks while the increasingly reduced spacing between the concave and cylinder subjects the ingested crop to increasingly aggressive threshing action for improved separation of grain from the leafy portion of the plant. The increasingly smaller gap between the rotating cylinder and concave in proceeding toward its upper trailing discharge edge also facilitates rearward discharge of the separated leafy portion of the plant from this threshing stage. Increased spacing between the concave crossbars adjacent its lower leading intake edge facilitates discharge through these apertures of soil debris and rocks ingested by the combine for removal from the threshing operation. Early removal of soil debris and rocks from the threshing operation facilitates separation of grain from the leafy portion of the plant and reduces the possibility of foreign matter ingested by the combine damaging its internal threshing components. Another aspect of this invention involves the use of flat filler plates alternately spaced with raspbars about the periphery of the rotating cylinder and extending the length thereof. The flat filler plates prevent a grain from becoming lodged on or adhering to the rotating cylinder and permit the grain to fall through the apertures in the fixed concave for recovery. Grain which remains in contact with the rotating cylinder tends to be displaced rearwardly with the leafy portion of the plant and to be discharged from the combine with this crop residue as waste. The flat filler plates of the cylinder thus increase the amount of grain recovered during the threshing process.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

I claim:

1. In a combine, an arrangement for separating grain from the leafy portion of a plant comprising:
   a rotating cylinder having a plurality of raspbars disposed in a spaced manner about its periphery and displaced in a circular path;
   a rotating beater disposed aft of and above said cylinder; and
   a grate-like concave having a lower leading intake edge and an upper trailing discharge edge respectively disposed directly below said cylinder and said beater and subtending a generally circular arc between said edges, wherein said concave is disposed in closely spaced, parallel relation to said rotating cylinder, said concave including a plurality of cross bars disposed in a spaced manner between said leading intake and trailing discharge edges and extending the length of said concave, wherein said cross bars are arranged so as to form an increasingly smaller gap between said cylinder and said concave in proceeding from the leading intake edge to the trailing discharge edge of said concave to facilitate separation of grain from the leafy portion of a plant, wherein each pair of adjacent cross bars defines an aperture therebetween and wherein the aperture between adjacent cross bars decreases in width in proceeding from the leading intake edge to the trailing discharge edge of said concave.

2. The arrangement of claim 1 wherein said concave further includes a plurality of curved intermediate bars arranged in a spaced manner along the length of the concave and wherein each of said curved intermediate bars is coupled to each of said cross bars and extends between said lower leading intake and upper trailing discharge edges.

3. The arrangement of claim 1 wherein the gap between said cylinder and said concave ranges from on the order of 5/16 inch to 1/8 inch in proceeding from the leading intake edge to the trailing discharge edge of said concave.

4. The arrangement of claim 1 wherein the aperture between adjacent cross bars ranges in width from on the order of 1.3757" adjacent the leading intake edge of said concave to on the order of 1.1264" adjacent the trailing discharge edge of said concave.

5. The arrangement of claim 1 wherein said cross bars are of increased width adjacent the lower leading intake edge of said concave and of reduced width adjacent the upper trailing discharge edge of said concave.

6. The arrangement of claim 1 wherein the rotating cylinder includes a plurality of star-shaped hub members arranged in a spaced manner along its length, wherein each hub member includes a plurality of upraised portions arranged in a spaced manner about its periphery, said rotating cylinder further including a plurality of raspbars and filler plates extending the length of said concave and arranged in an alternating manner about and coupled to each of said hub members.

7. The arrangement of claim 6 wherein each of said filler plates includes an inner flat portion extending between adjacent raspbars.

8. The arrangement of claim 7 wherein each of said filler plates further includes first and second opposed angled edges extending the length of said rasp bar and extending outwardly from the inner flat portion of said filler plate.

9. The arrangement of claim 8 further comprising first and second coupling means for respectively connecting said first edge of a filler plate to a rasp bar and a second edge of a filler plate to a hub member.

10. The arrangement of claim 9 wherein said first coupling means comprises a mounting clip and said second coupling means comprises a threaded coupler.

11. In a combine, an arrangement for separating grain from the leafy portion of a plant comprising:
   a grate-like concave having a lower leading intake edge, an upper trailing discharge edge and a plurality of cross bars disposed in a spaced manner between said leading intake and trailing discharge edges and extending the length of said concave;
   a rotating beater disposed generally above the trailing discharge edge of said concave; and
   a rotating cylinder disposed above and in closely spaced, parallel relation to said concave and including a plurality of star-shaped hub members arranged in a spaced manner along its length, wherein each member includes a plurality of upraised portions arranged in a spaced manner about its periphery, said rotating cylinder further including a plurality of raspbars and filler plates extending the length of said cylinder and arranged in an alternating manner about and coupled to each of said hub members, wherein each of said raspbars is coupled to an upraised portion of a star-shaped hub member and each of said filler plates includes an inner flat portion extending between adjacent raspbars; and
   each of said filler plates further include first and second opposed angled edges extending the length of said raspbar and extending outwardly from the inner flat portion of said filler plate;
   first and second coupling means for respectively connecting said first edge of a filler plate to a raspbar and a second edge of a filler plate to a hub member;
   the first coupling means comprises a mounting clip and said second coupling means comprises a threaded coupler;
   the mounting clip receiving the second edge therein.

* * * * *